United States Patent Office 3,004,007
Patented Oct. 10, 1961

3,004,007
VULCANIZING BROMINATED COPOLYMERS
Robert E. Clayton, Roselle Park, John R. Briggs, Westfield, and Francis P. Baldwin, Colonia, N.J., assignors to Esso Research and Engineering Company, a corporation of Delaware
No Drawing. Filed Nov. 14, 1957, Ser. No. 696,334
9 Claims. (Cl. 260—79.5)

This invention relates to the vulcanization of brominated rubbery copolymers of isoolefins and multiolefins such as brominated butyl rubber, and to the resulting compositions formed thereby. More particularly, the present invention relates to curing brominated rubbery isoolefin-multiolefin copolymers in the substantial absence of added elemental sulfur by an admixture of at least one bivalent metal oxide, preferably zinc oxide, certain thiuram sulfides and/or thiocarbamates, magnesium oxide and thiazyl sulfides.

The present invention is a continuation-in-part of U.S. application Serial No. 651,089 filed April 5, 1957, in the names of Robert E. Clayton et al.

It is known that unmodified isoolefin-multiolefin rubbery copolymers or brominated isoolefin-multiolefin rubbery copolymers may be cured by heating the same at an elevated temperature in the presence of minor proportions of a combination of curatives comprising an admixture of sulfur, zinc oxide, and thiuram sulfides and/or certain thiocarbamates. It has also been recently discovered that brominated isoolefin-multiolefin rubbery copolymers may be cured in the absence of added elemental sulfur in the presence of certain active polymethylol phenol resins by basic metal compounds which are advantageously bivalent metal oxides, of which zinc oxide is preferred. However, the foregoing zinc oxide-polymethylol phenol cure of brominated isoolefin-multiolefin rubbery copolymers results in vulcanizates which heat age only moderately well. Furthermore, the compounded unvulcanized brominated copolymer stocks containing zinc oxide and polymethylol phenol resins tend to have only fair scorch resistance.

In accordance with the present invention, it has now been found that brominated isoolefin-multiolefin rubbery copolymers, i.e., brominated butyl rubber may be effectively cured into vulcanizates having good heat aging resistance solely by combination of magnesium oxide, zinc oxide, a thiazyl sulfide and either a thiuram sulfide and/or a thiocarbamate, the magnesium oxide being added first to improve scorch resistance. More particularly, the magnesium oxide is mixed with the brominated copolymer prior to the addition of other curatives at a temperature level of between about 130° and 350° F. for a period of time of between about 5 seconds and 5 minutes. Preferably, 100 parts by weight of the unvulcanized, brominated isoolefin-multiolefin rubbery copolymer, prior to curing are blended at a temperature level of between about 160° and 300° F. for between about 10 seconds to 3 minutes in the substantial absence of added elemental sulfur with about 0.1 to 10.0 and preferably about 0.3 to 5.0 parts by weight of magnesium oxide. In the case where the preliminary blending or mixing is performed on a mill or in a Banbury, such mixing means is then regulated to a temperature level of between about 100° and 250° F. and preferably between about 130° and 220° F. and the magnesium oxide-containing stock then compounded in the substantial absence of added elemental sulfur with about 0.5 to 30, preferably about 1.0 to 20 parts by weight of zinc oxide, about 0.01 to 10.0, advantageously about 0.1 to 6.0, preferably about 0.3 to 4.0 parts by weight of a curing aid such as a thiuram sulfide and/or a thiocarbamate, and about 0.05 to 10.0, preferably about 0.5 to 6.0 parts by weight of a thiazyl sulfide.

The resulting composition is then subsequently vulcanized, also in the substantial absence of added elemental sulfur, as more fully described hereinafter. More particularly, the above new and useful vulcanizable compositions are then cured in the substantial absence of added elemental sulfur at a temperature level of from between about room temperature to about 450° F., advantageously between about 200° and 400° F., preferably between about 250° and 400° F. for a period of time of between about 0.05 minute up to about several hours or more, preferably for about 0.1 minute to about 5 hours, to give improved vulcanizates having outstanding heat aging resistance.

The thiuram sulfides found particularly useful for the purposes of the present invention include, among others, $C_1$ to $C_{10}$ alkyl (or $C_6$ to $C_{12}$ aryl, aralkyl or alkaryl) thiuram sulfides such as tetramethyl thiuram monosulfide, tetramethyl thiuram disulfide, tetraethyl thiuram disulfide, tetrabutyl thiuram disulfide, tetraamyl thiuram disulfide, di-N-pentamethylene thiuram tetrasulfide, tetraphenyl thiuram disulfide, tetrabenzyl thiuram disulfide, N-dimethyl-N'-phenyl aminoethyl-N'-phenyl thiuram disulfide, mixtures thereof, etc.

The thiocarbamates found to be particularly useful for the purposes of the present invention include, among others, such materials as metal or amine salts of thiocarbamic acids such as tellurium diethyl dithiocarbamate; zinc dimethyl dithiocarbamate; copper dimethyl dithiocarbamate; cadmium diamyl dithiocarbamate; zinc dibutyl dithiocarbamate; selenium dipropyl dithiocarbamate; lead dimethyl dithiocarbamate; bismuth dimethyl dithiocarbamate; lead (phenylaminoethyl) phenyl dimethyl dithiocarbamate; 2,4-dinitrophenyl dimethyl dithiocarbamate; potassium diethyl dithiocarbamate; lead (-o-tolyl-aminoethyl)-o-tolyl dimethyl dithiocarbamate; zinc-N-pentamethylene dithiocarbamate; zinc dibenzyl dithiocarbamate, N-pentamethylene ammonium pentamethylene dithiocarbamate; zinc (phenyl aminoethyl) phenyl dimethyl dithiocarbamate; mixtures thereof, etc.

The thiazyl sulfides useful for the purposes of the present invention include among others, benzothiazyl disulfide, bis-4,5-dimethyl thiazyl disulfide, zinc benzothiazyl sulfide, dinitrophenyl benzothiazyl sulfide, benzyl hexamethylene tetrammonium - 2 - benzothiazyl sulfide, phenyl aminomethyl - 2 - benzothiazyl sulfide, mixtures thereof, etc.

Also, the foregoing novel vulcanizable brominated rubbery copolymer-containing compositions, which are preferably brominated butyl rubber-containing compositions, may be blended with, prior to vulcanization, conventional amounts of carbon blacks, mineral fillers such as clays, silica, talc, diatomaceous earth, plasticizers, glycols, resins, waxes, organic esters, extender oils, anti-oxidants or the like.

The brominated rubbery isoolefin-multiolefin copolymers to be used may be made by the mild bromination of the synthetic rubber as more fully described hereinafter. The synthetic rubber to be brominated is advantageously a high molecular weight copolymer of a major proportion of an isoolefin and a minor proportion of a multiolefin. Copolymers of the above general type have Staudinger molecular weights between about 20,000 and 300,000 and iodine numbers of between about 0.5 and 50 (Wijs). Where the copolymer contains about 85 to 99.5 weight percent of a $C_4$ to $C_8$ isoolefin such as isobutylene, 2-methyl-1-butene, 3-methyl-1-butene, or the like, with about 15 to 0.5 weight percent of a multiolefin of about 4 to 14, preferably about 4 to 6 carbon atoms, they are commonly referred to in patents and in technical literature as "butyl rubber" or GR–I rubber (Government Rubber—Isobutylene). For instance, the preparation and uses of butyl rubber is described in U.S. Patent 2,356,128 to Thomas et al. and in the book "Synthetic Rubber" by G. S. Whitby. The rubber preferably comprises the reaction product of isobutylene with a conjugated diolefin such as isoprene, butadiene, dimethyl butadiene, piperylene or such multiolefins as cyclopentadiene, dicyclopentadiene, cyclohexadienes, dimethallyl, allo-ocymene, vinyl fulvenes, etc. The reaction product of isobutylene and isoprene is preferred.

The above-described rubbery polymer, which is preferably butyl rubber, is then brominated in a manner which does not degrade the molecular weight thereof, but sufficiently to produce a rubber which retains its tensile strength upon heat aging. The bromination is preferably carried out so as to make the resulting brominated butyl rubber contain about at least about 0.5 weight percent (preferably at least about 1.0 weight percent) combined bromine, but not more than about 3 "X" weight percent combined bromine wherein:

$$X = \frac{79.92L}{(100-L)M_1 + L(M_2 + 79.92)} \times 100$$

and:

$L$ = mole percent of the multiolefin in the polymer
$M_1$ = molecular weight of the isoolefin
$M_2$ = molecular weight of the multiolefin
$79.92$ = atomic weight of bromine Restated, there should be at least about 0.5 weight percent of combined bromine in the polymer but not more than about 1 to 3 atoms of bromine combined in the polymer per molecule of multiolefin present therein; i.e., not more than about 3 atoms and preferably not more than about 1 atom of combined bromine per double bond in the polymer.

Suitable bromination agents which may be employed are liquid bromine, alkali metal hypobromites, sulfur bromides, bromohydantoins, pyridinium bromide perbromide, N-bromo-succinimide, alpha-bromoacetoacetanilide, tribromophenol bromide, N-bromoacetamide, beta-bromo-methyl phthalimide and other common brominating agents.

The bromination is conducted at temperatures of from above about 0° to about 200°C. and preferably at about 20° to 150° C. for about one minute to several hours, the temperature and time being regulated to brominate the rubbery copolymer to the extent above-mentioned. The pressure is not critical, i.e., it may vary from about 0.5 to 500 p.s.i.a., atmospheric pressure being satisfactory.

The bromination of the rubbery copolymer may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto bromine or other brominating agent, optionally in solution, such as dissolved in an alkyl chloride, carbon tetrachloride, etc.

The concentration of the copolymer, such as butyl rubber, in the solvent (if a solvent is employed) will depend upon the type of reactor, molecular weight of the rubbery copolymer, etc. In general, the concentration of a butyl rubber having a viscosity average molecular weight of about 50,000 to about 2,000,000, preferably about 200,000 to about 1,500,000, if the solvent is a substantially inert hydrocarbon, will be between about 1 and 80% by weight, preferably about 5 to 40%.

The resulting brominated rubbery copolymer, such as butyl rubber, may be recovered in various manners. The copolymer may be precipitated with acetone or an alcohol or any other known non-solvent for the rubber and dried under about 1 to 760 millimeters or higher of mercury pressure absolute, at temperatures of about 0° to 180° C., preferably about 50° to 150° C. (e.g., 70° C.). Other methods of recovering the brominated rubbery copolymer, from the hydrocarbon solution of the same, are by conventional spray or drum drying techniques. Alternatively, the brominated rubbery copolymer-containing solution may be injected into a vessel containing agitated water heated to a temperature sufficient to flash off the hydrocarbon solvent and form an aqueous slurry of the rubbery brominated copolymer. This copolymer may then be separated from the slurry by filtration, dried and recovered as a "crumb" or as a dense sheet or slab by conventional milling and/or extruding procedures.

The brominated copolymer formed advantageously has a viscosity average moleculer weight between about 250,000 and 2,000,000 (i. e. about 10,000 to 150,000 Staudinger) and a mole percent unsaturation between about 0.2 to 15.0, preferably about 0.5 to 5.0. The copolymer before curing may be further compounded with various fillers such as carbon blacks, clays, silica, or titanium dioxide, etc. as well as with plasticizers which are preferably hydrocarbon plasticizer oils, antioxidants, waxes, organic phosphates, resins, etc.

In order to more fully illustrate the present invention, the following experimental data are given.

Example 1

Three master batches containing brominated butyl rubber were formulated. The brominated butyl rubbers used are known as "Hycar 2202" and "Esso Lot 53," both being commercial brominated butyl rubbers. The former is a brominated butyl rubber having a viscosity average molecular weight of 410,000, a mole percent unsaturation of 0.98 and a bromine content of 2.69 weight percent, the latter having a viscosity average molecular weight of 370,000, a mole percent unsaturation of 0.98 and a combined bromine content of 2.11 weight percent. Each master batch contained, per 100 parts by weight of total rubber, 3.0 parts by weight of zinc oxide, 60 parts by weight of HAF carbon black, 1 part by weight of stearic acid, 0 or 5 parts by weight of 2,6-dimethylol-4-octyl phenol resin, 5 parts by weight of a hydrocarbon plasticizer oil known as Necton 60 oil derived from a naphthenic base crude oil and having a specific gravity of 0.90, a flash point by the open cup method of 445° F., a viscosity in S.S.U. at 100° F. of 510, a viscosity in S.S.U. at 210° F. of 55, and an iodine number of 16 cg./g., 1 part by weight of 2,2'-methylene bis (4-methyl-6-tertiary butyl phenol) known as antioxidant 2246, 0 to 2 parts by weight of magnesium oxide, and the indicated amounts of benzothiazyl disulfide and tetramethyl thiuram disulfide. The resulting compounded formulations were as follows:

| Components | Parts by Weight | | |
|---|---|---|---|
| Rubber Stock No. | A | B | C |
| Hycar 2202 | 100 | 100 | |
| Esso brominated butyl—Lot 53 | | | 100 |
| Antioxidant 2246 | 1.0 | 1.0 | 1.0 |
| Magnesium Oxide | | 2.0 | 2.0 |
| HAF carbon black | 60 | 60 | 60 |
| Stearic acid | 1.0 | 1.0 | 1.0 |
| Necton 60 oil | 5.0 | 5.0 | 5.0 |
| Zinc oxide | 3.0 | 3.0 | 3.0 |
| 2,6-dimethylol-4-octyl phenol active resin | 5.0 | | |
| Benzothiazyl disulfide | | 2.0 | 2.0 |
| Tetramethyl thiuram disulfide | | 1.0 | 1.0 |

All compounded rubber stocks hereinbefore mentioned were then tested for Mooney scorch in minutes at 260° F., the time recorded in minutes being the period when a reading of 5 points above the minimum value was observed.

|  | A | B | C |
|---|---|---|---|
| Mooney Scorch at 260° F | 8 | 17 | 12 |

The above data show that brominated butyl rubber has a better (i.e., longer) Mooney scorch time, when compounded in accordance with the present invention (Rubber Stock Nos. B and C), with a combination of zinc oxide, magnesium oxide, a thiuram sulfide and a thiazyl sulfide than when using the heretofore very desirable considered polymethylol phenol resin cure.

*Example II*

The above rubber stocks were then vulcanized at 320° F. for 45 minutes and compared to the foregoing typical polymethylphenol resin type cure (Rubber Stock "A") both before and after a very severe aging test in which all vulcanizates were aged for 16 hours at 380° F. in a circulating air oven. The stress-strain data and tear strength in pounds per inch of thickness were as follows:

[Press cure for 45 minutes at 320° F.]

| Original Properties | Stock A | Stock B | Stock C |
|---|---|---|---|
| Tensile strength (p.s.i.) | 1,750 | 2,100 | 2,275 |
| Elongation (percent) | 220 | 375 | 540 |
| Tear (lbs./inch) | 115 | 205 | 345 |
| Properties after Aging: |  |  |  |
| Tensile strength (p.s.i.) | 215 | 1,170 | 1,000 |
| Elongation (percent) | 200 | 215 | 280 |
| Tear (lbs./inch) | 40 | 175 | 175 |

The data show that brominated butyl rubber which has been cured in the substantial absence of added elemental sulfur by a combination of zinc oxide, magnesium oxide, a thiuram sulfide, and a thiazyl sulfide (stocks B and C), upon severe aging results in vulcanizates still possessing tensile strengths above 1000 p.s.i. and tear strengths in excess of 150 lbs./inch whereas a similar polymethylol phenol cure aged as above shows only a tensile strength of 220 p.s.i. and a tear strength of 40 lbs./inch.

*Example III*

A commercial unmodified butyl rubber curing bladder stock and a commercial curing bladder stock known as the "Vanderbilt" stock where each compared to rubber stock "B" of the present invention as to Mooney scorch at 260° F. and retention of physical properties of vulcanizates cured at 320° F. for 45 minutes which had been aged for 16 hours at 380° F. in a circulating air oven. The results were as follows:

| Original Properties | Stock B | Vanderbilt Stock | Commercial unmodified butyl stock |
|---|---|---|---|
| Mooney scorch at 260° F | 17 | 16 | 5 |
| Tensile strength (p.s.i.) | 2,100 | 1,300 | 1,800 |
| Elongation (percent) | 375 | 320 | 410 |
| Tear (lbs./inch) | 205 | 115 | 215 |
| Properties after aging: |  |  |  |
| Tensile strength (p.s.i.) | 1,170 | 245 | 440 |
| Elongation (percent) | 215 | 205 | 290 |
| Tear (lbs./inch) | 175 | 60 | 80 |

The above data show that the zinc oxide-magnesium oxide-Altax-Tuads compositions of the present invention are less scorchy and age better than commercially available curing bladder stocks.

An especially desirable embodiment of the present invention comprises the use of brominated isoolefin-multiolefin-containing copolymers, particularly brominated butyl rubber, which has been compounded and cured in accordance with the present invention, in curing bags, particularly tire casing curing bags or tire casing curing diaphragms or bladders such as those used in Bag-O-Matic presses. Such tire curing bags or curing bladders have a combination of relatively severe requirements. One of such requirements concerns processing. For instance, in the manufacture of curing bladders, the compound is first formed into a relatively massive step which is between about one and two and one-half inches thick preferably about 1.5 to 2.0 inches thick and between about 3 and 5 inches wide, preferably about 3.5 to 4.5 inches wide. With compounded rubber stocks such as have heretofore been in general use, it is necessary to form this mass by plying it up from thin strips, which have been preferably processed on a cool calender, since such prior art compositions are relatively scorchy. However, when using the brominated butyl rubber compositions of the present invention which have been subjected to a preliminary blending with magnesium oxide, such massive strips may be directly extruded or otherwise processed in a single forming operation which is much more economical and faster than the methods of the prior art involving plying up such masses. The reason why such compositions in accordance with the present invention may be extruded with facility is that they have good scorch resistance and are substantially void from incipient cure, gelation or prevulcanization during extrusion and during the time required for such a thick mass to cool down after extrusion.

Another processing step where the good scorch resistance of the compositions containing brominated butyl rubber and magnesium oxide of the present invention stand out is during the molding of curing bags and curing bladders. In the case of curing bladders, the thick massive strip referred to hereinbefore, is cut into a predetermined length and the two ends spliced together and placed in the press to be formed into the shape of the curing bladder. The compositions of the present invention have been found to be readily shaped without scorching (during such a forming operation). Also, premature vulcanization during such forming or shaping has not been encountered.

The use requirements for the finished curing bags and bladders are also particularly severe. In the case of curing bladders it must be stiff enough to form the tire properly yet flexible enough to be distorted considerably. More particularly, when the tire curing press is in position to receive the uncured or "green" tire, the curing bladder is in the configuration of a generally cylindrical form having folds generally running lengthwise thereof. These folds are due to the fact that at this stage the curing bladder is under vacuum to make it small enough that the unvulcanized tire may be placed over it easily. After the unvulcanized tire is in position, the tire mold is closed and a heating medium such as steam is injected into the bladder. This forces the bladder against the tire and the tire against the press which molds the tire into the desired form. More steam is then injected into the bladder which forces the bladder still tighter against the unvulcanized tire and forces the tire firmly against the mold matrix so that the proper design is molded into the tire. Heretofore, the maximum steam temperature permissible for curing bladders has been about 340° F. whereas temperatures of 360° F. or 380° F. or higher may be used when employing the compositions of the present invention. This has permitted considerably shortened times for curing tires in the mold.

After the tire has been cured in situ in the mold, the mold is opened and the bladder collapsed from the tire by vacuum. The bladder is maintained in this collapsed position while the cured tire is being removed from the mold and while the next unvulcanized tire is inserted. Since this cycle is repeated many times using the same curing bladder, such a bladder must maintain good flexibility to stand up. It has been found that the compositions of the present invention adequately meet such re-

What is claimed is:

1. A composition which comprises 100 parts by weight of the reaction product of a brominated copolymer of 85 to 99.5 wt. percent of a $C_4$ to $C_8$ isoolefin and 15 to 0.5 wt. percent of a $C_4$ to $C_{14}$ multiolefin, said copolymer containing at least about 0.5 weight percent bromine but not more than about three combined atoms of bromine per double bond in the copolymer, and an admixture of about 0.5 to 30 parts by weight of zinc oxide, about 0.01 to 10.0 parts by weight of magnesium oxide, about 0.05 to 10.0 parts by weight of a thiazyl sulfide, and about 0.01 to 10.0 parts by weight of a member selected from the group consisting of thiuram sulfides, thiocarbamates, and mixtures thereof, said composition being free of added elemental sulfur.

2. A composition according to claim 1 which contains per 100 parts by weight of brominated copolymer, about 0.3 to 10.0 parts by weight of magnesium oxide, about 1.0 to 30.0 parts by weight of zinc oxide, about 0.5 to 10.0 parts by weight of a thiazyl sulfide and about 0.1 to 10.0 parts by weight of a member selected from the group consisting of thiuram sulfides, thiocarbamates, and mixtures thereof.

3. A composition according to claim 1 in which the thiuram sulfide is a $C_1$ to $C_{10}$ alkyl thiuram sulfide.

4. A composition according to claim 1 in which the thiocarbamate is a metal salt of dithiocarbamic acid.

5. A composition according to claim 1 in which the magnesium oxide is added first to the brominated copolymer, mixed at a temperature level of between about 130° and 350° F. for between about 5 seconds and 5 minutes with said copolymer, with the subsequent addition at a temperature level of between about 100° and 250° F. of the remaining ingredients.

6. A composition comprising a rubbery polymer having a Staudinger molecular weight of between about 20,000 and 150,000, comprising atoms of hydrogen, carbon and bromine, containing in its structure from about 85 to 99.5 weight percent of hydrocarbon units derived by the polymerization of an isoolefin containing about 4 to 8 carbon atoms with a $C_4$ to $C_{14}$ multiolefin, and also containing sufficient atoms in which a pair of carbon atoms is linked by an olefinic double bond that the mole percent unsaturation of the polymer is from about 0.5 to 15, said polymer containing at least about 0.5 weight percent combined bromine but not more than about 3 "X" weight percent combined bromine wherein "X" equals:

$$\frac{79.92L}{(100-L)M_1 + L(M_2+79.92)} \times 100$$

and $L=$ mole percent of the multiolefin in the polymer
$M_1=$ molecular weight of the isoolefin
$M_2=$ molecular weight of the multiolefin and
$79.92=$ atomic weight of bromine, 100 parts by weight of said polymer being composited with about 0.3 to 5.0 parts by weight of magnesium oxide, about 1.0 to 20 parts by weight of zinc oxide, about 0.5 to 6.0 parts by weight of a thiazyl sulfide, and about 0.3 to 4.0 parts by weight of a member selected from the group consisting of thiuram sulfides, thiocarbamates and mixtures thereof, said composition being free of added elemental sulfur.

7. A composition according to claim 6 in which the magnesium oxide has been blended in the absence of other materials with the bromine-containing polymer at a temperature level of between about 130° and 350° F. for between about 5 seconds and 5 minutes.

8. An improved process for vulcanizing a rubbery copolymer of 85 to 99.5 wt. percent of a $C_4$ to $C_8$ isoolefin and 0.5 to 15 wt. percent of a $C_4$ to $C_{14}$ multiolefin which comprises dissolving the unvulcanized copolymer in a solvent, brominating the copolymer so as to contain at least about 0.5 weight percent bromine but not more than about three atoms of bromine per double bond in the copolymer, recovering the brominated copolymer from solution, compounding 100 parts by weight of said brominated copolymer with about 0.1 to 10.0 weight percent of magnesium oxide, mixing the brominated copolymer and magnesium oxide in the absence of added elemental sulfur at about 130° to 350° F. for between about 5 seconds and 5 minutes, regulating the resulting mixture to a temperature level of between about 130° and 220° F., compounding the resulting mixture in the absence of added elemental sulfur with about 0.5 to 30 parts by weight of zinc oxide, about 0.5 to 10 parts by weight of a thiazyl sulfide, and about 0.1 to 10 parts by weight of a member selected from the group consisting of thiuram sulfides, thiocarbamates, and mixtures thereof, and vulcanizing the compounded mixture formed at a temperature level of between about 250° and 400° F. for between about 0.1 minute and 5 hours.

9. A vulcanized product produced by the process of claim 8.

References Cited in the file of this patent

UNITED STATES PATENTS

| 2,631,984 | Crawford | Mar. 17, 1953 |
| 2,698,014 | Morrissey et al. | Dec. 28, 1954 |

OTHER REFERENCES

Barron: "Modern Synthetic Rubbers," p. 437, (1949), 3rd edition, Chapman & Hall Ltd., London.

S. S. Rogers: "The Vanderbilt, 1948 Rubber Handbook," Vanderbilt Pub. Co., N.Y., 1948, pp. 84–86 and p. 223.